(No Model.)

S. J. CILLEY.
BELT PULLEY.

No. 249,897. Patented Nov. 22, 1881.

WITNESSES:

INVENTOR:
S. J. Cilley
BY Munn & Co
ATTORNEYS.

UNITED STATES PATENT OFFICE.

SEWELL J. CILLEY, OF GONIC, NEW HAMPSHIRE.

BELT-PULLEY.

SPECIFICATION forming part of Letters Patent No. 249,897, dated November 22, 1881.

Application filed October 13, 1881. (No model.)

*To all whom it may concern:*

Be it known that I, SEWELL J. CILLEY, of Gonic, in the county of Strafford and State of New Hampshire, have invented a new and useful Improvement in Belt-Pulleys, of which the following is a full, clear, and exact specification.

Reference is to be had to the accompanying drawings, forming part of this specification, in which similar letters of reference indicate corresponding parts in both the figures.

Figure 1:
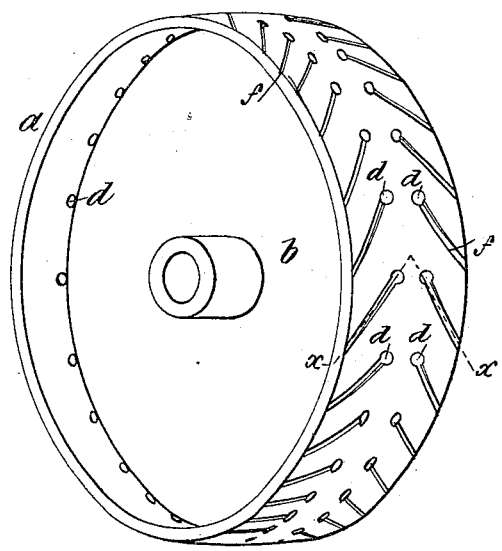
Figure 2:
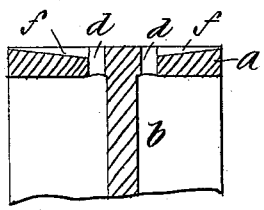

Figure 1 is a perspective view of my improved belt-pulley; and Fig. 2 is a detailed section of the same, taken on the line $xx$ of Fig. 1.

The invention consists in forming the periphery of the pulley with holes, passages, or ducts for the escape of air from between the belt and the pulley and to roughen the surface of the pulley to increase the frictional contact of the belt.

The invention also consists in grooving or incising the periphery of the pulley from or near the center of the belt-surface diagonally to the edges thereof, whereby the tendency of the belt to run off from the pulley is to a great extent overcome.

Referring to the drawings, the pulley shown is of the ordinary form, having the broad periphery or belt-surface $a$ and the central filling or disk, $b$. The periphery of the pulley is perforated through the belt-surface with the double series of holes $d\ d$, which are such distance apart as to afford free escape of air from between the belt and the pulley at all points of their contact. From each of the holes $d\ d$ the surface of the pulley is formed with the grooves or gutters $ff$, which run diagonally from the holes to the edges of the pulley. These grooves serve as conduits for the passage of the air from that part of the surface of the pulley between the series of holes and the edges of the pulley, and when the pulley is turned at great speed a partial vacuum will be formed in the grooves, causing the belt to adhere with great force to the pulley; and besides this, the grooves serve at the same time to roughen the surface of the pulley, and the grooves being made diagonal across from the edges to the center of the pulley, they tend to keep the belt central upon the pulley and prevent its running off. But for the latter result the grooves or gutters might be made parallel with the axis of the pulley, and in some instances I propose to make the grooves in this manner, and in any instance where the holes are not to be used (as in case of slow speed) the grooves will extend entirely across the surface of the pulley, if made parallel with the axis, or, if cut diagonal, they will be made to intersect each other at or near the center of the pulley.

Having thus described my invention, I claim as new and desire to secure by Letters Patent—

1. A belt-pulley formed with peripheral air-passages for the escape of air from between the belt and the surface of the pulley, substantially as desribed.

2. The belt-pulley herein shown and described, formed with the series of holes $d\ d$ and the diagonal grooves $ff$, substantially as and for the purposes set forth.

SEWELL JEFFERSON CILLEY.

Witnesses:
NAHUM YEATON,
GASPARD WELCH.